Inventor:
ARTHUR M. McCREA
By John H. Bruninga
His Attorney

June 21, 1938.   A. M. McCREA   2,121,763
TARGET TRAP
Filed Feb. 12, 1935   2 Sheets-Sheet 2

Inventor:
ARTHUR M. McCREA
By John H. Bruninga
His Attorney.

Patented June 21, 1938

2,121,763

UNITED STATES PATENT OFFICE 2,121,763

TARGET TRAP

Arthur M. McCrea, Lamar, Mo., assignor to Western Cartridge Company, East Alton, Ill., a corporation of Delaware Application February 12, 1935, Serial No. 6,167

3 Claims. (Cl. 124—8)

This invention pertains to target traps, such as are used for throwing clay pigeons in trap shooting.

In certain forms of trap shooting it is desirable to throw the target in such a manner that it may be projected either directly away from the shooter or toward his right or left. In each such flight the trajectory followed by the target should be as nearly the same as possible. As the presence of a wind at the time of shooting has a determining effect upon the flight of the target, especially when the direction of the wind is transverse to that of the flight of the target, it is important to provide adjustments whereby the effect of the wind may be compensated for.

One of the objects of this invention, therefore, is to provide a trap adjustable so as to be able to vary the aspect of the target to the wind as well as to the shooter.

In some forms of trap shooting it is customary to launch two or more targets at the same time but in slightly different directions. In such a case it is important to have the flight of both targets, except for direction, as nearly the same as possible even in spite of the presence of a cross wind.

Another object of this invention, therefore, is to provide a trap capable of throwing double targets and which is adjustable so as to cause both targets to fly in substantially the same manner.

Another object is to provide a novel trap structure whereby the manner in which the target is launched by the trap may be varied in accordance with the velocity at which it is launched.

Another object is to provide such a trap structure wherein the velocity or energy of discharge may be controlled in accordance with the direction in which the target is launched.

Another object is to provide a trap structure of simple design and which will be rugged in service.

Further objects will appear from the following description taken in connection with the accompanying drawings, in which:—

Figure 1:
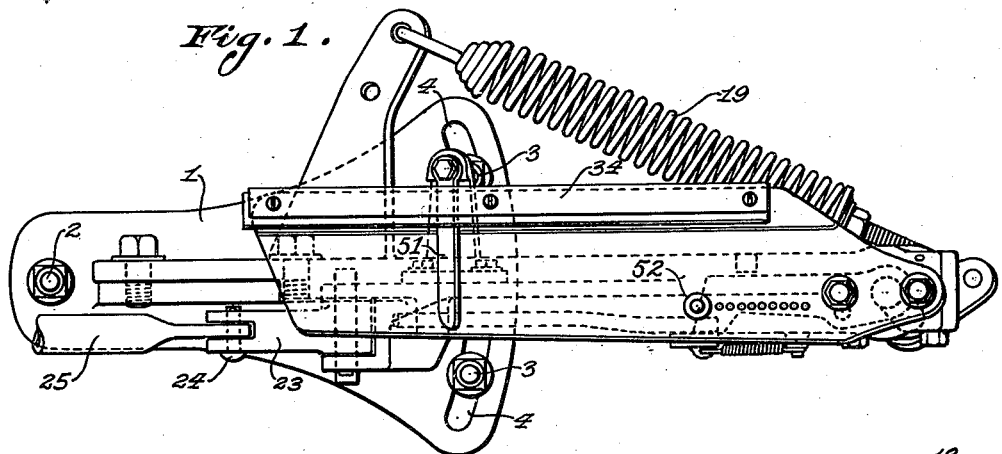
Figure 1 is a plan view of a trap embodying this invention.

Referring now to the drawings, 1 designates a base upon which the trap is carried and which may be mounted on any suitable support or platform from which the targets are to be thrown. The base 1 is held in place on its support by a pivot bolt 2 about which said base may be swung in order to adjust the horizontal direction in which the targets are launched. A pair of clamping bolts 3 working in arcuate slots 4 are adapted to clamp the base in adjusted position.

Pivoted at 5 on an upstanding web 6 of the base 1 is a frame 7. This frame may be adjusted on the pivot 5 so as to increase or decrease its vertical angle whereby to adjust the angle of elevation at which a target is launched. The frame 7 may be clamped in an adjusted position by means of a clamp screw 8 working in an arcuate slot 9 in the frame 7. The forward end of the frame 7 is provided with a bearing 10 in which is journaled a shaft or spindle 11 having fixed thereto at its upper end a plate 12 which in turn has adjustably mounted thereon a carrier or throwing arm 13. The lower end of the shaft 11 is provided with a collar 14 having arms 15 and 16 extending radially therefrom. The arm 15 is pivoted at 17 to a stud 18 adjustably engaging a spring 19 whose other end is secured to an arm 20 on the frame 7. The spring 19 functions by pulling on the arm 15 to rotate the shaft 14 and therefore the carrier 13 for throwing the target. The arm 16 has connected thereto a tension member comprising a chain 21 and a link 22 which in turn is connected to a trigger arm 23. The arm 23 is pivoted at 24 to a push-pull rod 25 of the usual type. Plate 12 has a rearwardly extending arm 26 adapted to engage behind a sear 27 pivoted at 28 on the frame 7 and tensioned by spring 29. The push-rod 30, slidable at 31 in the frame 7, is pivoted at 32 to the lower end of the sear 27.

Figure 2:
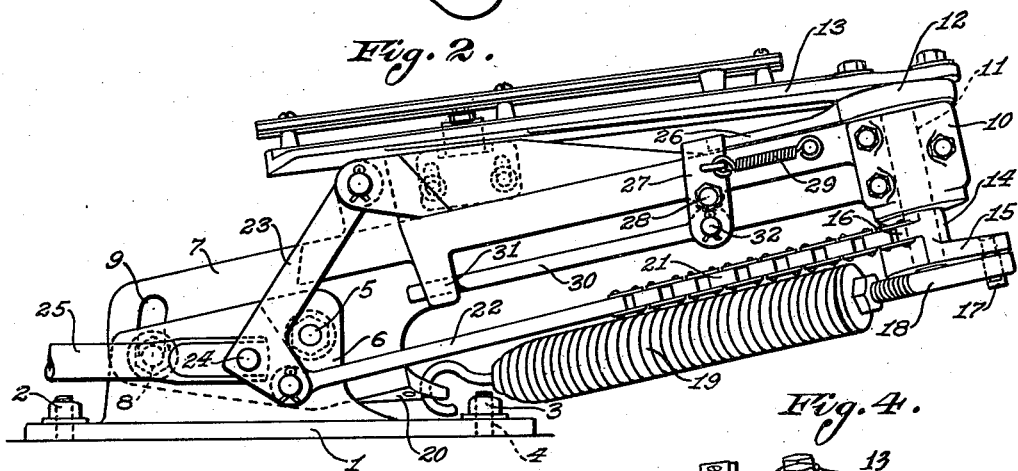
Figure 2 is a side view of the same.

The above-described mechanism is adapted to function as follows: In order to set the trap the operator pulls rearwardly on the rod 25. This swings the arm 23 to the rear and pulls the tension member 22, 21 which in turn rotates shaft 11 in a clockwise direction as seen in Figure 1, at the same time stretching the spring 19. At the completion of this movement the arm 26 engages behind the sear 27 and the trap is set. One or more targets may now be placed upon the carrier 13. A finger 51 mounted on the frame 7 extends across the top of the carrier 13 so that a target may be placed upon the carrier and located thereon by moving it against the finger 51; said finger is adjustable on the frame so as to vary the location of the target. A second target may be placed upon the carrier and in order to locate the same, a stop button 52 may be fixed in any one of a series of holes 33; or, as is customary, the inner target may be positioned against the stop button 52 and the outer target placed against the inner. Mounted on the top of the carrier 13 is a rail 34 against which the targets are placed. In order to release the trap the operator pushes forwardly or to the right, Figure 2, on the rod 25. This swings the arm 23 forwardly, loosens the tension member 22, 21, and at the limit of its motion the arm 23 engages the rear end of the rod 30, pushing said rod forwardly and thereby swinging the sear 27 on its pivot so as to release the arm 26. This releases the carrier which now swings in a counter-clockwise direction as seen in Figure 1 under the tension of the spring 19. During such motion the targets, moving under centrifugal force, roll on the rail 34 and pass off of the carrier at an appropriate point in its swing and after having attained a velocity sufficient to carry them through the desired path of flight.

Figure 3:
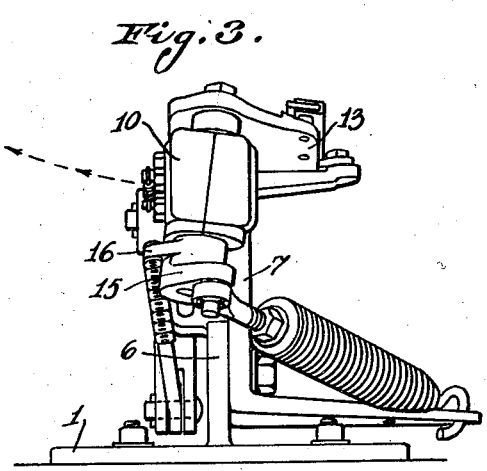
Figure 3 is a front view of the same or a view from the right-hand end of Figure 2.
Figure 4:
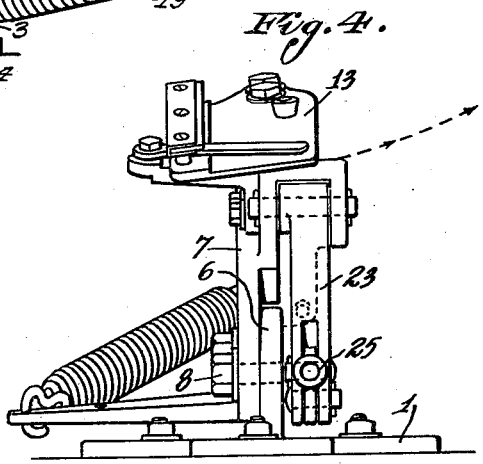
Figure 4 is a rear view of the trap.

In accordance with the present invention the shaft 11 is not positioned in a vertical plane passing through the frame 7 as is usually the case with prior traps, but is canted somewhat to the right, as shown in Figure 3. This canting has an important effect upon the flight of the targets from this trap. An amount of deviation of approximately 4½° from the vertical has been found to give good results, but this may vary considerably.

Figure 5:
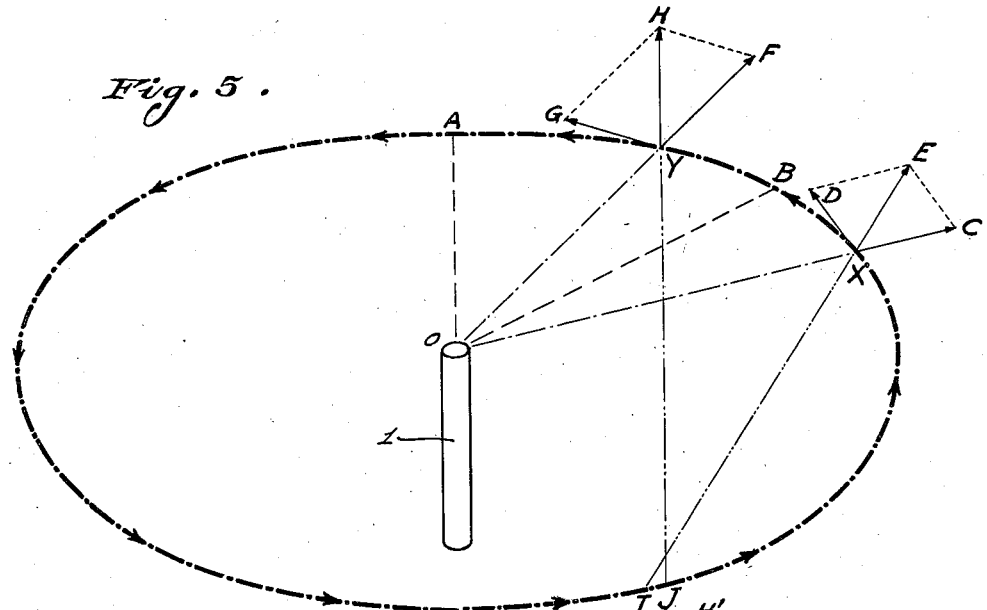
Figure 5 is a diagram drawn to illustrate a theory of action for a trap of prior construction.

Referring now to Figure 5 the ellipse represents a perspective view of the path of movement of a certain point on the carrier 13; namely the point at which the targets leave the carrier. The ellipse represents a complete circular path about the shaft 11. It will be remembered, however, that the carrier itself may describe only a portion of this complete circle. It is also pointed out that while the carrier is set on the shaft 11 in a position slightly angular thereto in accordance with the usual practice and, therefore, in moving on the shaft 11 as an axis sweeps through a conical figure, the movements represented in Figure 5 are shown as taking place within the plane of the circle of movement in order to avoid unnecessary complexity in the following description. The main difference between Figure 5 and the actual trap is that on account of the conical path the angles at which the targets are launched will be slightly higher than would be the case if the carrier moved in the plane of the circle.

While it is not intended to limit this invention to any particular theory of action, a certain theory will be used in the following for the purpose of explanation only.

In imparting energy to a target during the throwing operation the carrier 13 may be considered as imparting two component velocities, both of which vary until the instant at which the target leaves the carrier, at which time the target moves off with the velocity and in the direction of the resultant of the component velocities.

Figure 5 represents the condition in which the shaft 11 is simply tipped rearwardly in accordance with prior practice and is not canted laterally with respect to the straightaway direction from the shooter. In this figure the circle is seen as from the position of the shooter looking in the direction of a straightaway target. In this figure the point A is the highest point in the circle. It is usually required to launch the target within a certain angle from the straightaway direction which may be represented by the direction OA. The extreme lateral angle at which targets are launched may be represented by the line OB. Under these conditions the velocity and direction with which any target will be launched will depend upon the point on the circle at which it leaves the carrier. For instance, an early target may leave the carrier at the point X. At the instant of leaving the target has a velocity of rotation around the axis 1, which may be represented by the arrow XD. This is due to its movement in a direction tangential to the circle. At the same time it has a velocity which is radial in direction and which is due to its movement along the carrier by rolling along the rail 34. This velocity may be represented by the arrow XC. When the target leaves the carrier its velocity will be the resultant of XD and XC, namely XE. All of these arrows lie in the plane of the circle as all of these velocities are imparted in that plane.

In the case of a later target it may be assumed that such target leaves the carrier at the point Y. At this point also tangential and radial velocities are represented by YG and YF, respectively, and the resultant which represents the actual velocity and direction of the target is YH. The relative directions of the two targets may be visualized by extending the line EX in the plane of the circle to I and the line HY also in the plane of the circle to J. These lines both lie in the same plane. The line of maximum slope of that plane is the line OA since A is the highest point of the circle. Accordingly, the line HJ representing the direction of the later target is more nearly in the direction of the line OA than is the line EI, representing the direction of the early target. Accordingly, the second target is launched at a higher angle of elevation than the first.

The relative magnitudes of these velocities are proportional to the speed of movement of the carrier at the points X and Y. As the carrier is traveling faster at the point Y than at the point X, for the reason that the tension of the spring 19 has imparted a continuing acceleration thereto, it will be seen that the second target is launched not only at a higher elevation but also at a higher velocity than the first target. The result is that there will be a great difference in the flight of these two targets, the second one traveling farther than the first.

Figure 6:
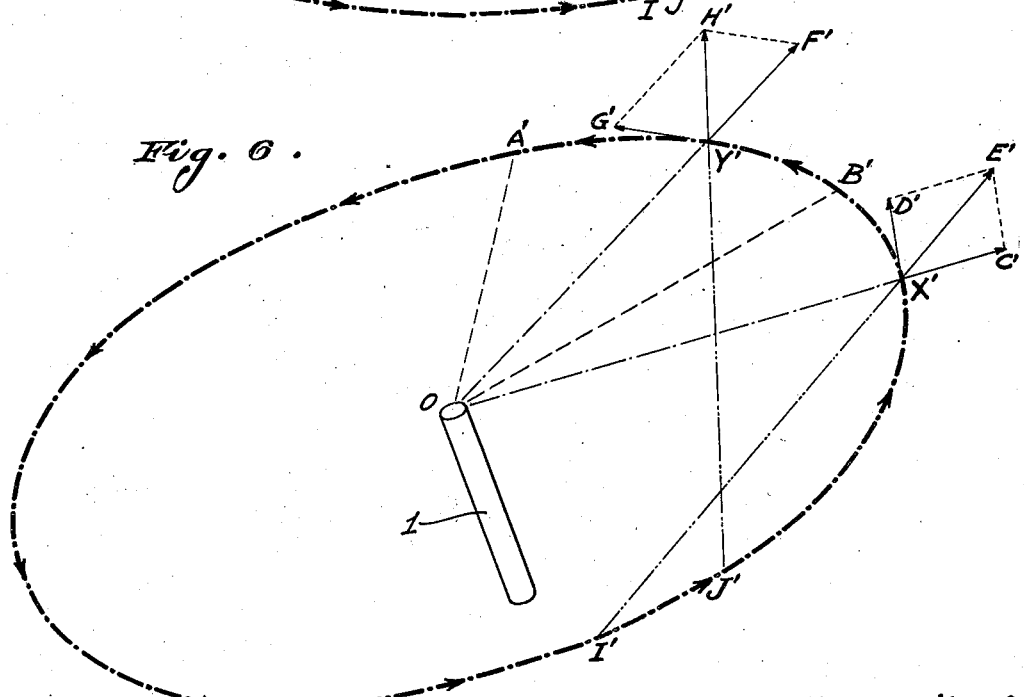
Figure 6 is a similar diagram illustrating the application of this theory to the trap of the present invention.

In accordance with the present invention, this effect has been corrected to a large extent by the canting of the shaft 11. This condition is illustrated in Figure 6 in the same conventional manner as described for Figure 5. The same reference characters have been used except that they have been primed to distinguish them from those of Figure 5. In this case, therefore, the target launched at X' travels with a velocity X'E' in the direction I'E' and the target launched at Y' travels with a velocity Y'H' in the direction J'H'. In the case of Figure 6, however, the line OA' is no longer the line of maximum slope of the plane of the circle. In this case some other line more nearly in the position of the line OB' will be the line of maximum slope. Assuming that OB' is the maximum slope, it will be noted that now the line I'E' has a greater elevation than the line J'H'. In other words, the relative elevations have been reversed as compared with Figure 5, the relative velocities, however, have not been changed. Accordingly, the earlier target, launched at a lower velocity is thrown at a higher elevation while the second target, launched at a higher velocity, is thrown at a less elevation. These effects compensate each other and it has been found that two targets may be thrown in different directions and adjusted for substantially identical trajectories. This is particularly important when two targets are thrown together. One must necessarily leave the carrier after the other and with the shaft 11 canted in accordance with this invention the increase in velocity is compensated for by a decrease in elevation.

It will be understood, of course, that a variety of effects may be obtained by changing the direction and amount of the lateral inclination of the shaft 11. It will be noted, however, that an early target will practically never be launched at a point much earlier than the point X'. This is for the reason that the direction of launching; namely I'E' is limited to the shooting conditions. In canting the shaft 11 so as to place the point of maximum elevation B' in the neighborhood of the point X', a condition is fixed whereby the early target is launched at substantially the maximum elevation while the later targets will be launched at progressively less elevation and, therefore, the continually increasing velocity of the carrier is compensated for by a corresponding decrease in the angle of elevation. The term "elevation" as used herein is used in the sense of the angle above the horizontal at which the target is launched.

It will be noted that the spring 19 is anchored on the arm 20 at a point laterally offset with respect to the frame 7. By moving the point of anchorage inwardly or outwardly from the frame the conditions of acceleration of the carrier may be altered. The acceleration of the carrier ceases when it has turned to a position where the arm 15 is in line with the spring 19. The torque exerted by the spring on the shaft 11 becomes zero at this point. As the carrier swings beyond this point the spring begins to retard the movement of the carrier. A similar adjustment may be obtained by varying the angular position of the arm 15 with respect to the carrier so that this point of zero torque may be made to occur at any desired position of the carrier. This feature may be combined with the cant of the shaft 11 by placing this point of zero torque, for instance, in a position in the neighborhood of the point B' as shown in Figure 6, so that beyond this point not only the elevation but also the velocity may decrease. By varying these relations practically any desired adjustment in the relative flight of two targets may be obtained.

These adjustments are important particularly in throwing targets in a cross wind. As the two targets launched in different directions are not only traveling in different directions with respect to the direction of the wind but they present different aspects to the wind. By this is meant that the wind may strike one target on its upper surface and the other on its lower surface. The result will be that the first target is depressed by the wind and its flight shortened while the second is elevated and its flight extended. By changing the points of launching of the targets on the circle as described for Figure 6 and also, if necessary, readjusting the direction of the trap on its pivot 2, the flight of both targets may be adjusted to a cross wind to compensate for its effects and so as to produce a substantially identical flight for both targets.

It will be seen that this invention provides a trap of a simple spring actuated design in which the flight of double targets may be effectively controlled not only to compensate for the varying acceleration imparted by the spring but also to compensate for the effect of wind on the range.

As already stated the theory outlined above has been used for illustration only and is not desired to limit the invention to any particular theory. Furthermore, various individual features or sub-combinations of the structure described may be useful without reference to other features, and it is understood that the employment of such individual features or sub-combinations is contemplated by this invention and is within the scope of the appended claims.

It is obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. In a target trap of the character described, a target carrier, means for swinging said carrier to throw the target, a shaft on which said carrier swings, and means for mounting said shaft at a definite inclination rearwardly and laterally with respect to the trap.

2. In a target trap of the character described, a target carrier adapted to receive two targets simultaneously, means for moving said carrier at a progressively increasing velocity to launch the targets successively therefrom, and means constraining the movement of said carrier to an arcuate path having an axis inclined rearwardly and laterally with respect to the trap.

3. In a target trap of the character described, a target carrier adapted to receive two targets simultaneously, means for swinging the carrier with a variable velocity to throw the targets, and means providing an axis for the swing of said carrier positioned at a definite inclination rearwardly and laterally with respect to the trap.

ARTHUR M. McCREA.